March 27, 1956 T. V. TYLER 2,739,636
METHOD AND APPARATUS FOR BENDING C-STAGE
POSTFORMABLE PLASTIC MATERIAL
Filed June 19, 1953 10 Sheets-Sheet 1

INVENTOR.
TRUMAN V. TYLER
BY
William L. Lane
ATTORNEY

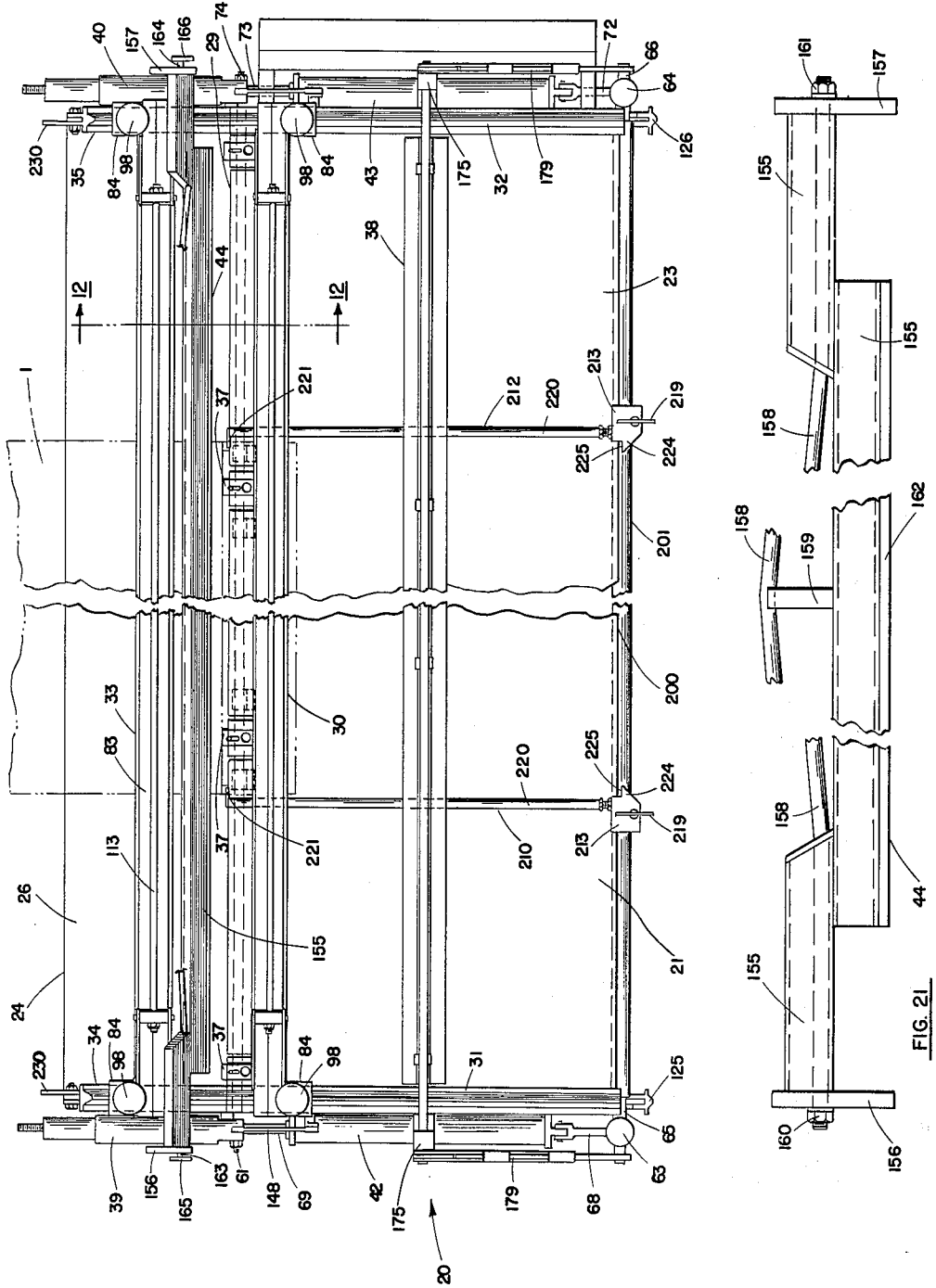

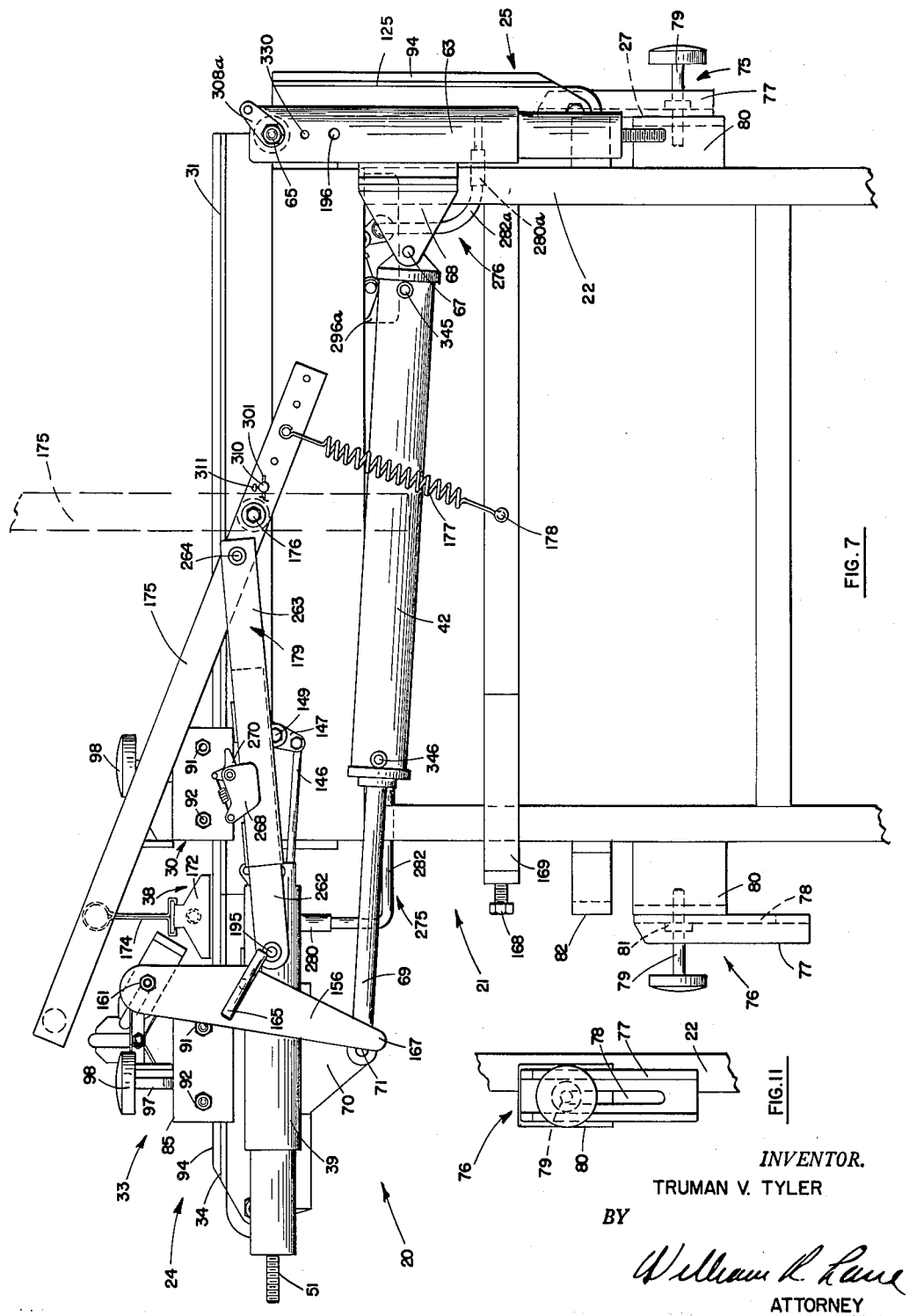

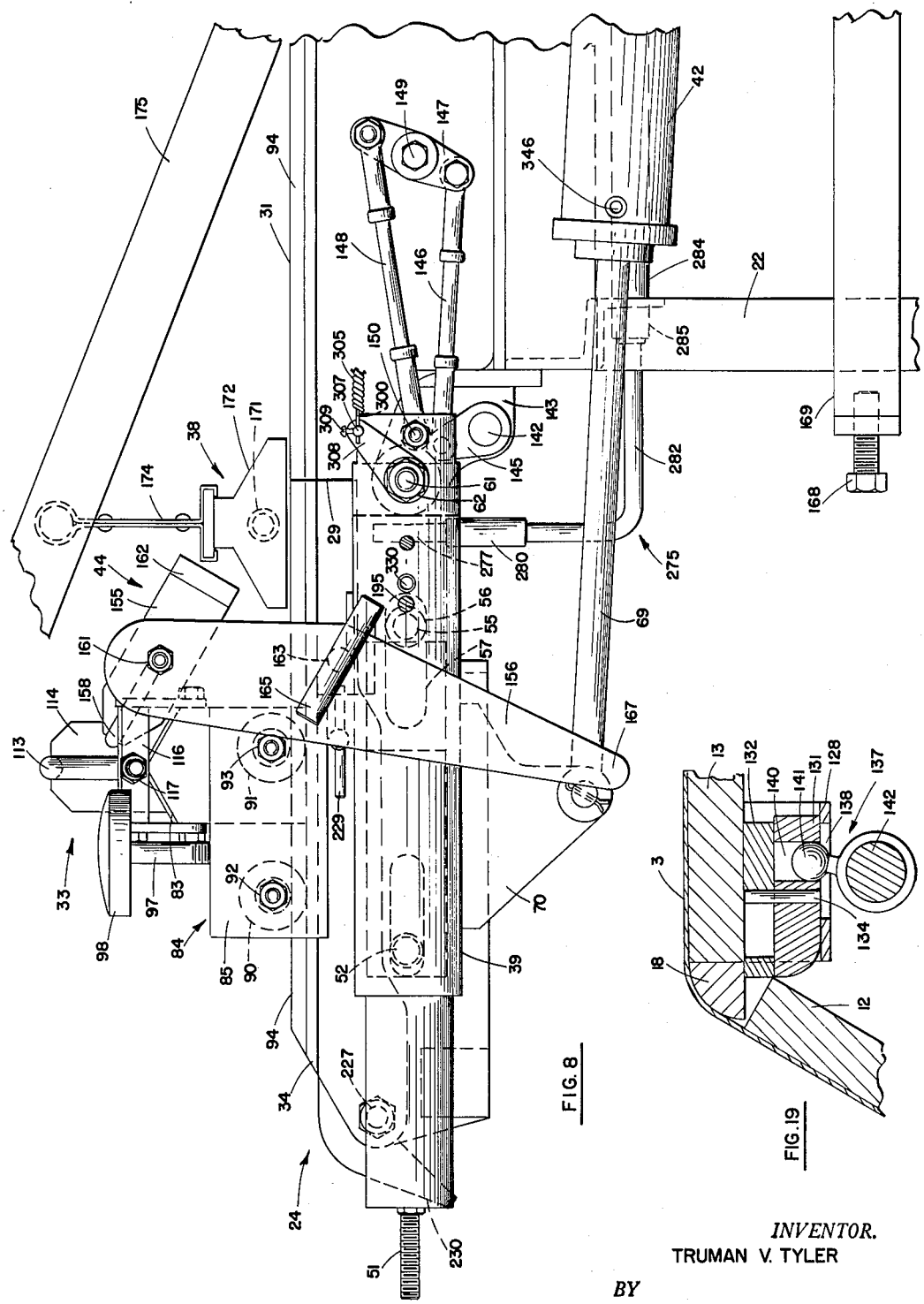

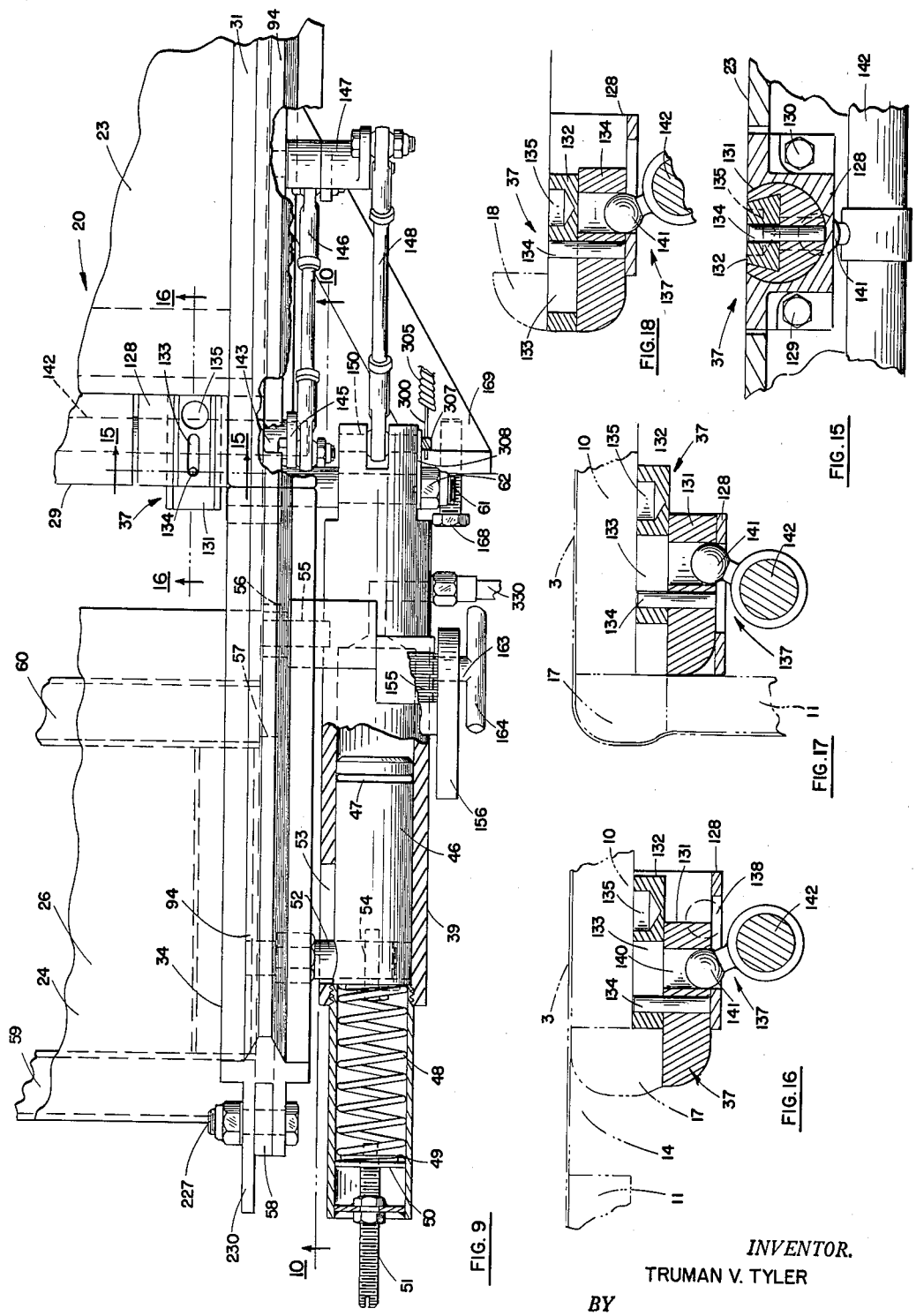

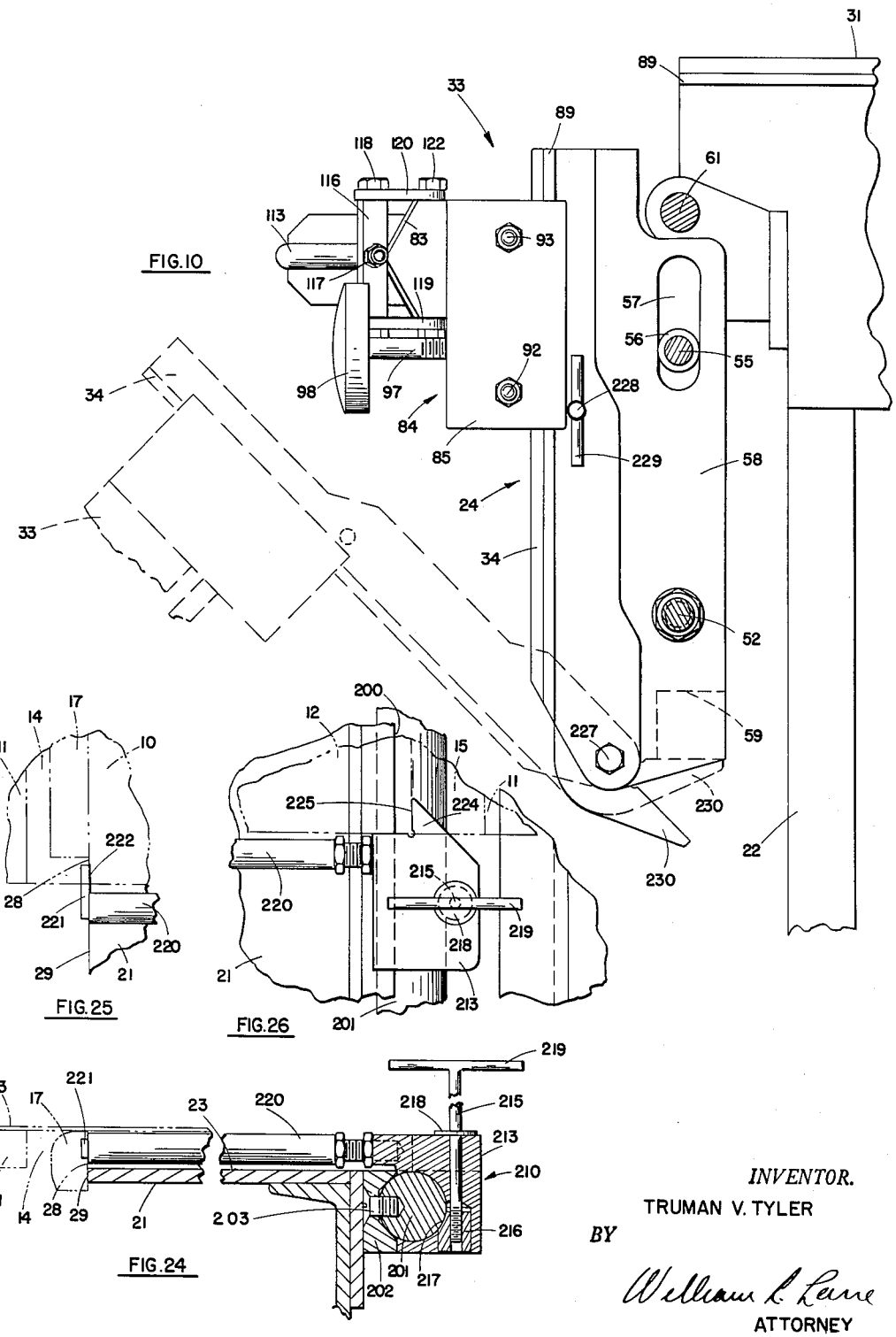

March 27, 1956 T. V. TYLER 2,739,636
METHOD AND APPARATUS FOR BENDING C-STAGE
POSTFORMABLE PLASTIC MATERIAL
Filed June 19, 1953 10 Sheets-Sheet 7

INVENTOR.
TRUMAN V. TYLER
BY
William R. Lane
ATTORNEY

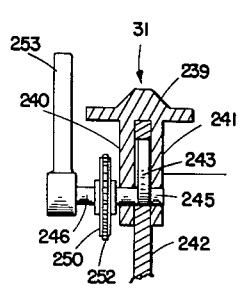
FIG. 28
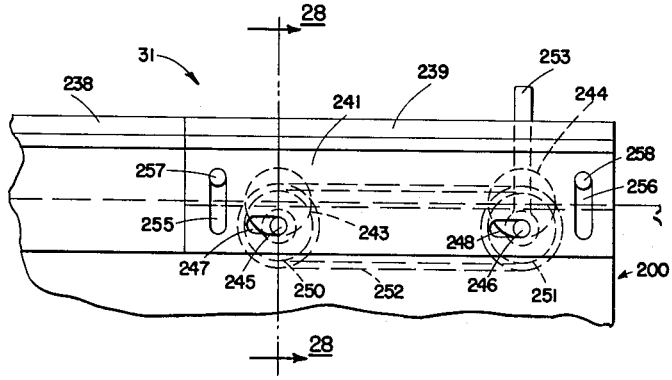
FIG. 27
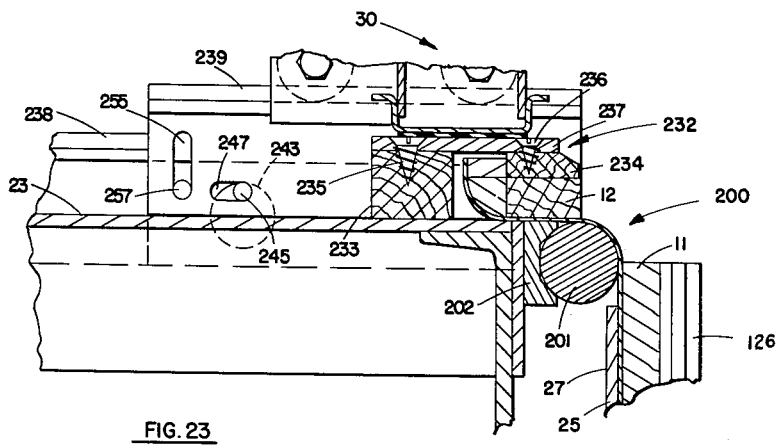
FIG. 23
FIG. 20
INVENTOR.
TRUMAN V. TYLER
BY
William R. Lane
ATTORNEY

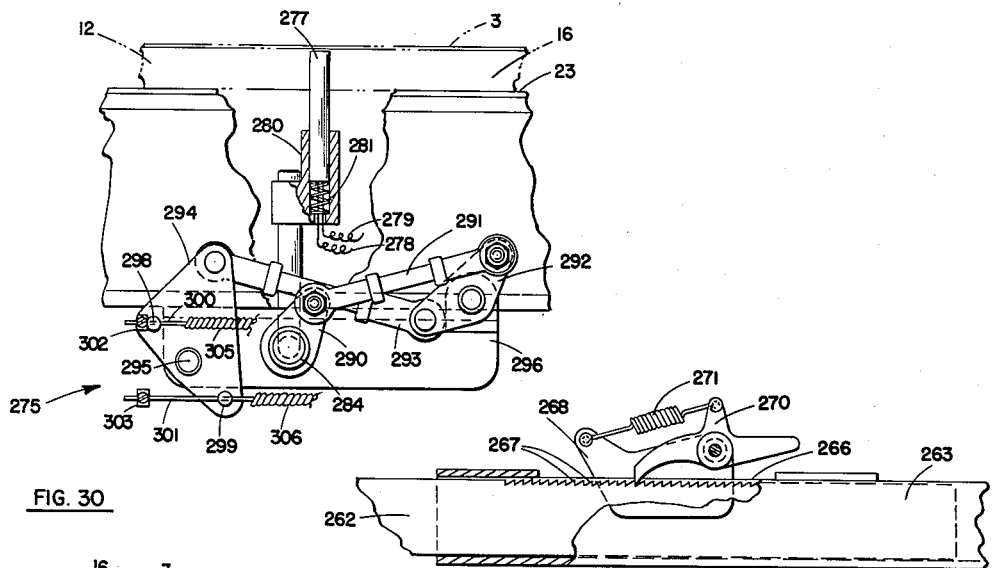
FIG. 30
FIG. 22
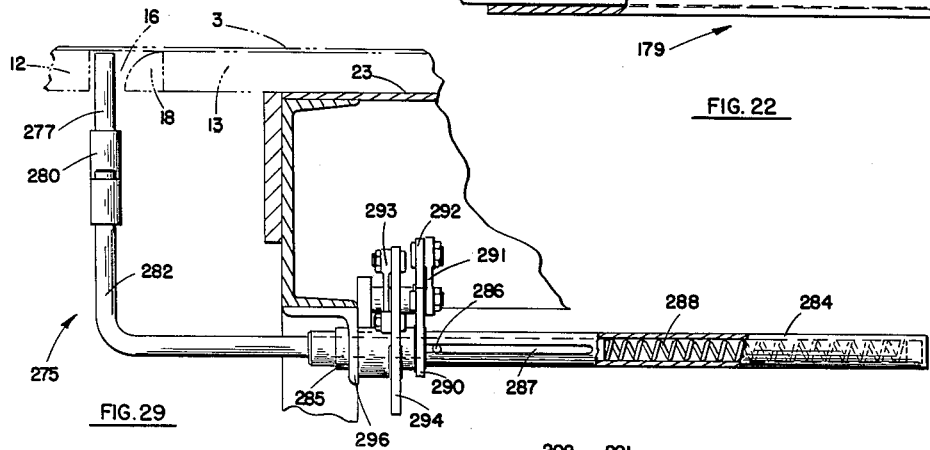
FIG. 29
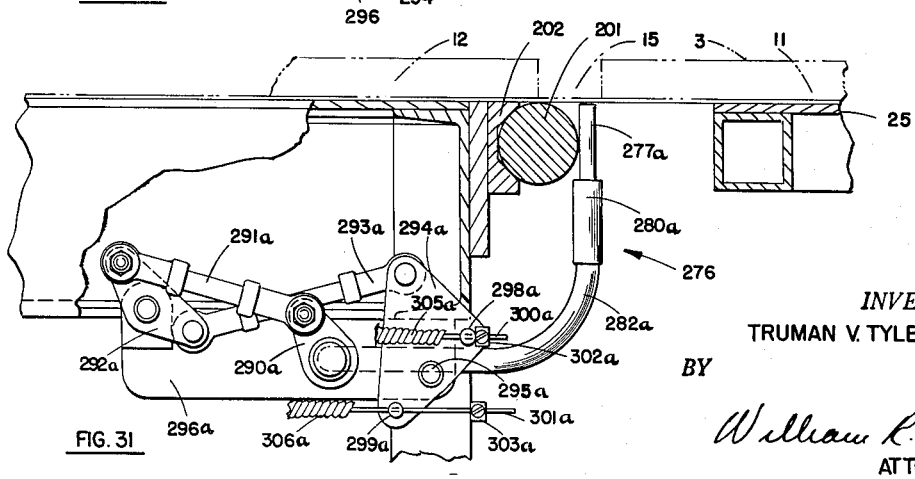
FIG. 31
INVENTOR.
TRUMAN V. TYLER
BY
William R. Lane
ATTORNEY March 27, 1956 T. V. TYLER 2,739,636
METHOD AND APPARATUS FOR BENDING C-STAGE
POSTFORMABLE PLASTIC MATERIAL
Filed June 19, 1953 10 Sheets-Sheet 10

INVENTOR.
TRUMAN V. TYLER
BY
William R. Lane
ATTORNEY

United States Patent Office 2,739,636
Patented Mar. 27, 1956

2,739,636

METHOD AND APPARATUS FOR BENDING C-STAGE POSTFORMABLE PLASTIC MATERIAL

Truman V. Tyler, Palos Verdes Estates, Calif., assignor to North American Aviation, Inc., Los Angeles, Calif., a corporation of Delaware Application June 19, 1953, Serial No. 362,833

16 Claims. (Cl. 154—1.8)

This invention pertains to a bending machine and more particularly to a machine adapted to bend C-stage postformable plastic material.

As disclosed in U. S. Patent No. 2,433,643, it has been discovered that a plastic C-stage thermosetting resinous material can be postformed after heating to certain temperature ranges. Such material has had wide application both industrially and for the use in producing tops for drain boards and other table or counter tops where curved edges and corners are desired or necessary. In the case of the ordinary kitchen drain board, for example, it has been found that C-stage thermosetting resin impregnated material formed into a lamination with a decorative sheet of material at the surface and reinforced on the underside with plywood provides a durable article with a very pleasing appearance when curved to form a one-piece backsplash, counter surface and no-drip edge portion. However, the use of this material in the production of such drain board units has been handicapped by lack of adequate equipment to provide satisfactory bending operations. It has been difficult to provide uniform heating of the portion of the sheet of plastic to be bent, and it has been found very troublesome to obtain bending forces on the material of the right type and magnitude. Furthermore, all types of existing equipment have required a great deal of time-consuming, costly material handling.

Therefore, it is an object of this invention to provide a bending machine that will automatically bend postformable plastic material.

Another object of this invention is to provide a bending machine which will provide inside and outside bends.

A still further object of this invention is to provide a machine which will produce a bend having a single, constant curvature or will provide a bend with a reverse curvature.

An additional object of this invention is to provide a machine having a heater means which will provide localized heating of a bendable portion of a workpiece.

Yet another object of this invention is to provide a bending machine having a retractable die supporting means so that for an outside bend the die may become an integral part of the postformed unit when the bending operation is complete.

Still another object of this invention is to provide a bending machine having die supporting means which are adjustable for dies of various thicknesses.

A further object of this invention is to provide a bending machine having heater means which are automatically removed from heat transfer relationship with a workpiece upon bending of the workpiece.

Another object of this invention is to provide a bending machine having means to position a workpiece whereby a bendable portion thereof is disposed adjacent a die means.

An additional object of this invention is to provide a bending machine which will place bendable portions of a workpiece under tension during a bending operation.

A still further object of this invention is to provide a bending machine which will form material about a die whereby the path of an involute curve is followed.

Yet another object of this invention is to provide a bending machine having means to automatically effect a bending operation when a workpiece has attained a predetermined temperature.

These and other objects will become apparent from the following detailed description taken in connection with the accompanying drawing in which—

Figure 3:
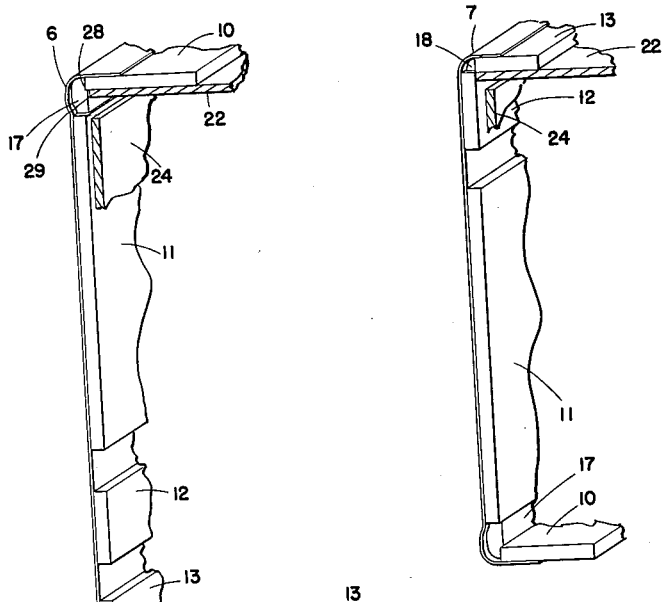
Figure 4:
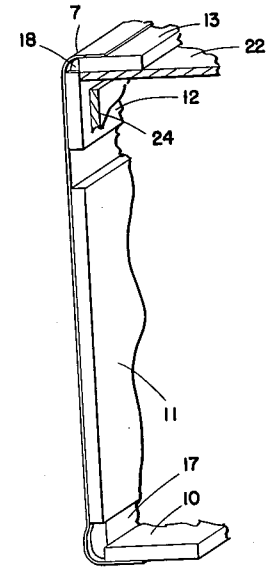
Figure 5:
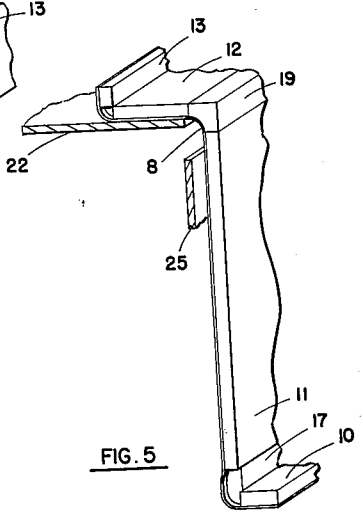
Figure 32:
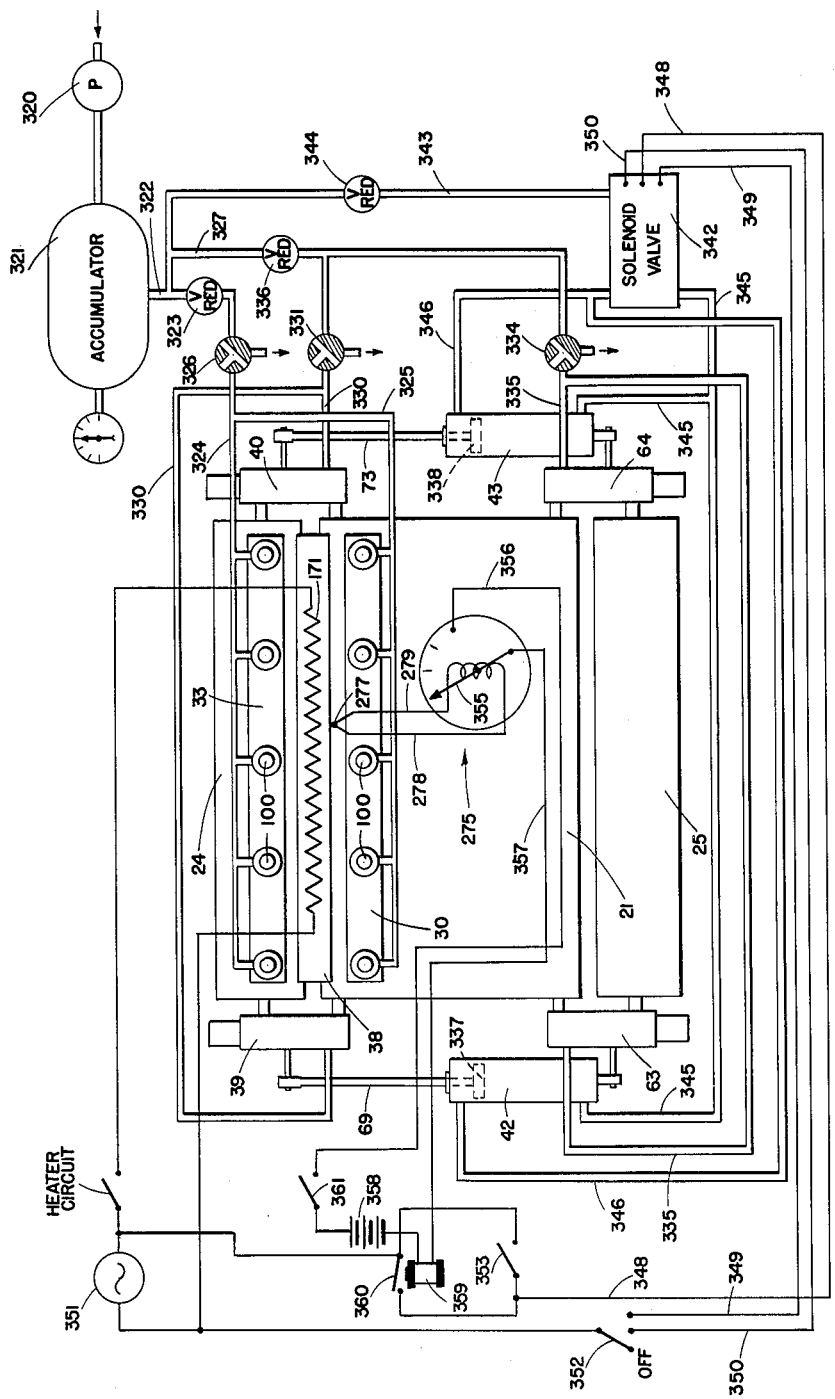

Figs. 3, 4, and 5 are fragmentary perspective views illustrating the various bending operations, Fig. 6 is a top plan view of the bending machine, Fig. 7 is a side elevational view of the machine, Fig. 8 is an enlarged fragmentary side elevational view of the machine, Fig. 9 is a fragmentary top plan view illustrating the tensioning cylinders, retractable fingers and other detailed arrangements, Fig. 10 is a sectional view taken along line 10—10 of Fig. 9 but with the drop leaf in a lowered position, Fig. 11 is a side elevation of the drop leaf down lock, Fig. 12 is a sectional view taken along line 12—12 of Fig. 6 but with the drop leaf in a lowered position, Fig. 13 is a sectional view taken along line 13—13 of Fig. 12, Fig. 14 is a sectional view taken along line 14—14 of Fig. 13, Fig. 15 is a sectional view taken along line 15—15 of Fig. 9, illustrating the retractable die support, Fig. 16 is a sectional view taken along line 16—16 of Fig. 9, illustrating the retractable die support, Figs. 17, 18, and 19 are fragmentary sectional views similar to Fig. 16 illustrating the operation of the retractable die support, Fig. 20 is a fragmentary side elevational view illustrating the kinematics of the bending operation, Fig. 21 is a side elevational view of the auxiliary forming member for producing a no-drip edge, Fig. 22 is a fragmentary elevational view, partially in section, illustrating the telescoping heater link, Fig. 23 is a fragmentary sectional view illustrating an adapter for use with a workpiece having a short back splash, Fig. 24 is a sectional view illustrating the arrangement of the gage for positioning the workpiece, Fig. 25 is a fragmentary plan view of the gage as applied to a notch for producing an outside bend, Fig. 26 is a fragmentary plan view of the gage as applied to a notch for producing an inside bend, Fig. 27 is a side elevational view illustrating a movable track section, Fig. 28 is a sectional view taken along line 28—28 of Fig. 27, Fig. 29 is a side elevational view, partially in section, of the temperature sensing element linkage for the outside bend, Fig. 30 is an end elevational view, partially in section, of the arrangement of Fig. 29, Fig. 31 is a side elevational view, partially in section, of the temperature sensing element linkage for use with an inside bend, and Fig. 32 is a schematic view illustrating the operation of the various elements of the bending machine of this invention.

Figure 1:
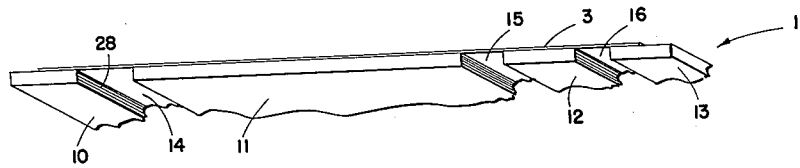
Fig. 1 is a fragmentary perspective view of a workpiece prior to forming.
Figure 2:
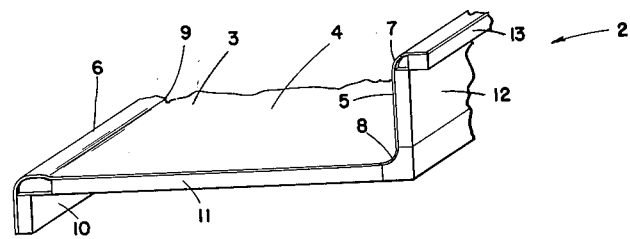
Fig. 2 is a fragmentary perspective view of a completed part.

By the provisions of this invention a workpiece 1, such as that illustrated in Fig. 1, can be transformed to a fully formed sink top 2 shown in Fig. 2. This sink top is provided with a laminated sheet 3 of C-stage thermosetting resinous material which is a postformable material in accordance with the teachings of U. S. Pat. No. 2,433,643. The upper surface of this laminated sheet may include a decorative pattern to give the finished article a pleasing appearance. To the under surface of the sheet is attached plywood or other suitable rigid reinforcing material. The finished part includes a main flat surface 4, a backsplash portion 5 and a raised no-drip front edge portion 6. The backsplash includes a simple outside convex bend 7 at the top end thereof and an inside concave bend 8 between the backsplash and the flat surface 4. No-drip or bull-nose edge 6 is an outside convex bend and includes a reverse curvature indicated at 9, which results in a raised edge portion which will prevent liquid on surface 4 from running off the front edge of the drainboard. In order to provide such a part as shown in Fig. 2 a flat sheet 3 of plastic material is attached to reinforcing members 10, 11, 12 and 13 in any suitable manner such as by gluing so that these reinforcing members are in spaced parallelism providing notches 14, 15 and 16 at which locations the sheet 3 of postformable material is unreinforced. These notches provide bending areas for bending portions 6, 8 and 7, respectively, on the finished part. The successive steps involved in carrying out the bends required to form the finished top are illustrated in Figs. 3, 4 and 5. Thus as shown in Fig. 3, bend 6 has first been made about a die member 17 which may be of a wooden strip and in the finished part disposed between plywood sections 10 and 11 so as to form a portion of the completed part. Next, as shown in Fig. 4, outside bend 7 for the backsplash is made around die member 18, and this die member may be also of wood and end up disposed between plywood sections 12 and 13 as a part of the finished workpiece. Lastly, cove section 8 is bent after which cove member 19 is added and the complete, reinforced, fully-formed drainboard top is completed.

To accomplish this bending, a machine 20 is provided, a top plan view of which is shown in Fig. 6, a side view in Fig. 7, and various details of which are illustrated in the other figures of drawing. The main element of this machine includes a table 21 which has a suitable supporting structure 22 and a flat top 23 on this structure. Additionally, there are provided drop leaves 24 and 25 which have flat top surfaces 26 and 27, respectively. These drop leaves are pivotally connected to the table, and it is by the unique pivoting action of these drop leaves that the various bends illustrated in Figs. 1 through 5 are obtained. The outside or convex bends are accomplished by drop leaf 24, while inside or concave bends are produced by drop leaf 25. These drop leaves are adapted to assume either of two positions. In one position the drop leaf is up with its flat top surface in alignment with the top surface of the table. Drop leaf 24 is illustrated in this position in Figs. 6 and 7. In the other position of the drop leaf it is pivoted 90° downwardly from the up position, being thereby at right angles to table top 23. Drop leaf 25 is shown in the down position in Figure 7 of the drawing. The drop leaves also are movable laterally between an extended and a retracted position, as more fully explained hereinafter.

The general operation of the machine is such that a workpiece may be placed on top 23 of the table and on top of one of the drop leaves where it is held, heated, placed under tension and bent. As shown in Fig. 6, in which the workpiece is illustrated in phantom for purposes of clarity, workpiece 1 is disposed on table top 23 and on top surface 26 of drop leaf 24. The plywood reinforcing surface is down, engaging the top of the drop leaf and of the table in such a manner that edge 28 of notch 14 is exactly in line with edge 29 of the table top. The portion of the workpiece on table 21 is held firmly in position by hold down means 30. This hold down means comprises a beam having retractable power-operated elements to clamp the workpiece in position, as will be more clearly described below. This beam is movable on tracks 31 and 32 to a suitable position just over the workpiece at which time the clamping means can be actuated to firmly secure the workpiece to the table. A similar hold down means 33 is provided on the drop leaf 24. This hold down means is movable on tracks 34 and 35 so that it can be suitably positioned over the portions of the workpiece on the drop leaf and the clamping means then actuated to firmly hold the workpiece in position. Backing members 10 and 13 may extend beyond plastic sheet 3 so that the hold down means can always firmly engage the workpiece.

In the illustration of Figs. 6 and 7 where bend 6 is to be made by the machine, die 17 is supported adjacent notch edge 28 and table edge 29 by means of a plurality of retractable finger members 37. The machine also includes a suitable heating element 38 which is movable relative to the table top. In Fig. 6 the heater is illustrated in a raised position remote from the workpiece. When the workpiece has been suitably clamped into position, heating element 38 is moved to where it is disposed in heat transfer relationship with notch 14 to be formed, as shown in Fig. 7, so that the unreinforced plastic material of this area may then be heated to a postformable temperature after which the forming operation can take place. Such a temperature should heat the plastic sheet throughout to a temperature in excess of around 250° F. but less than about 350° F.

For a satisfactory tight bend it has been found that the notch width, and thus the width of the bendable portion of the sheet, should be substantially equal to the peripheral width of the die surface about which the material is to be bent so that all of the unbacked portions can be conformed to the die contour without damage to the material. Also, tension should be applied to this unreinforced plastic material at the location of the notch during the bend. For drop leaf 24 this is accomplished by urging the drop leaf away from the table by means of tensioning cylinders 39 and 40. The drop leaf is then pivoted relative to the table to the down position at 90° to the position shown in Figs. 6 and 7 of the drawing. This bends material 3 at the location of notch 14 about the die to assume the contour thereof. During the bend the sheet of plastic pulls the drop leaf toward the edge 29 of the table in opposition to the tension exerted by cylinders 39 and 40, so that the pivoted portion follows an involute curve. Pivotal movement of the drop leaf is accomplished by means of actuating cylinders 42 and 43. As the drop leaf goes down, for producing the reverse curvature 9 of edge 6, an additional forming member 44 is urged against the workpiece to force it at all locations into intimate contact with the die. The workpiece is then held in this bent position until it is cool, after which time it may be removed without danger of springback. The successive bends are accomplished in a generally similarly manner. Drop leaf 24 will provide the outside bend, such as those at 6 and 7, while drop leaf 25 is designed for producing inside bend 8. The details of the construction and operation of the unit as described briefly above will be more clearly brought out hereinafter.

One of the important features of this invention is the manner in which the drop leaves are floatingly carried in their pivotal connection to the table. The tensioning cylinders serve to provide this floating pivotal connection, which in the case of drop leaf 24 is accomplished by means of cylinders 39 and 40. The arrangement of cylinder 39, which is identical to the connection for the other cylinders, is best seen by reference to Fig. 8, which is a side elevational view, Fig. 9 which is a top plan view and Fig. 10 which is a side view taken along line 10—10 of Fig. 9, but with the drop leaf shown in a lowered position. Within tensioning cylinder 39, as shown in Fig. 9, an elongated piston 46 is reciprocal and sealed relative to the interior wall of the cylinder by means of O-ring 47. Piston 46 is biased to the right by means of spring 48 disposed in cylinder head 49. This spring bears against disc 50 which is movable within the cylinder head by means of bolt arrangement 51 whereby the tension of the spring, and thus the force biasing the piston to the right, can be adjusted. A pin 52 secured to and carried by the drop leaf projects through a slot 53 in the cylinder wall to an opening in piston 46 in which it is secured by means of a screw 54. Near the other end of cylinder 39 a pin 55 is secured to and carried by the cylinder and projects therefrom toward the drop leaf. The end of pin 55 carries a roller 56 which engages a slot 57 in end flange 58 of the drop leaf. In this manner drop leaf 24 is floatingly carried by cylinder 39 through reciprocative piston 46 and roller 56 which runs in slot 57 of the drop leaf end flange. The drop leaf includes suitable reinforcing members 59 and 60 which extend beneath top surface 26 of the drop leaf to a similar end flange on the opposite end of the drop leaf, by means of which tensioning cylinder 40 floatingly carries the opposite end of drop leaf 24 in exactly the same manner. It is thus far obvious that any force within cylinders 39 and 40 urging the pistons away from the table will also exert a force urging the drop leaf away from the table edge to an extended position. The springs within the tensioning cylinders will tend to move the drop leaf toward the table to a retracted position when there is no greater force on the pistons urging the drop leaf away. The lateral movement of the drop leaf can be limited by the length of the slots or the piston travel.

At the inner end of cylinder 39 beyond slot 57 there may be seen the pivotal connection to the table. For this purpose a stud 61 is secured to the table and extends therefrom, passing through the end of cylinder 39 to which it is suitably secured by means of nut 62. Cylinder 39 is thus pivotally connected to the table by means of stud 61 so that the cylinder rotates about the axis of this stud. Cylinder 40 is similarly pivotally mounted on stud 74.

The mounting for drop leaf 25 is the same as for drop leaf 24 so that tensioning cylinders 63 and 64 carry drop leaf 25 by means of a roller arrangement and by the pistons within these cylinders. Cylinders 63 and 64 are pivotally connected to the table by means of studs 65 and 66.

As pointed out above, the actuating force for pivoting the drop leaves comes from cylinders 42 and 43. The arrangement for cylinder 42, which is identical to the arrangement for cylinder 43, may best be seen in Figs. 7, 8 and 9. One end of cylinder 42 is pivotally connected by pin 67 to bracket 68 which in turn is attached to cylinder 63. A rod 69 extends from the other end of the cylinder and connects by means of pin 71 with a similar bracket 70 attached to cylinder 39. On the other side of the machine cylinder 43 is attached to bracket 72 of cylinder 64, and piston rod 73 extends from the cylinder and pivotally attaches to the bracket of tensioning cylinder 40. Cylinders 42 and 43 are the ordinary pneumatic type in which a piston is reciprocal and operates the piston rod.

In order to operate drop leaf 24, drop leaf 25 is first pivoted to the lowered position illustrated in Fig. 7 and locked in this position. Locking of this leaf is accomplished by means of a slidable lock member 75. An identical lock 76 is provided for drop leaf 24, a detail of which is shown in Fig. 11. These locks may consist simply of a section of a U-shaped channel 77 having a slot 78 therein. Threaded screw 79 freely passes through the slot of lock member 77 and is received in bracket 80 which is attached to frame 22. Member 77 may be slid over the top surface of the drop leaf when the drop leaf is down, and tightened in position by means of screw 79 which has an enlarged boss 81 that engages portions of lock 75 around the slot therein. When the lock is thus held over the top of the drop leaf it is impossible to move the drop leaf to a raised position. A similar lock arrangement may be provided on the opposite side of each drop leaf so that there is uniform holding action. Furthermore the bottom surface of a lowered drop leaf engages a pad 82 which is attached to the frame and prevents any further pivotal movement. Each of members 82, therefore, acts as a stop means for a drop leaf when it is pivoted downwardly and limits the travel thereof to 90° when this is the desired curvature for a bend.

After drop leaf 25 has been locked in the down position, drop leaf 24 may be pivoted relative to the table to the down position by retracting piston rods 69 and 73 to a position further within cylinders 42 and 43 which pulls the tensioning cylinders and the drop leaf downwardly. The actuating cylinders themselves will not move as the rods are retracted because of their attachment to locked drop leaf 25.

Prior to the downward pivoting of the drop leaf it is of course necessary to position the workpiece on the table and the drop leaf, to clamp it in place and apply tension thereto. For clamping the workpiece in place for a bend by means of drop leaf 24, hold down means 30 and 33 are slid on tracks 31 and 32, and 33 and 34, to a desired position above the workpiece, as discussed briefly above. Both ends of each of these beams are mounted on rollers so that they may slide readily along the rails. For example, holddown means 33 may include a relatively light sheet metal crossbeam 83 which has at its ends identical roller units 84 secured to the beam by any suitable means such as by welding (see Figs. 12 and 13). Each of these roller units includes a housing 85 the bottom portion of which has flanges 86 and 87 adapted to fit beneath flanges 88 and 89 of the rails. Two rollers 90 and 91 are carried by pins 92 and 93 within housing 85. These rollers are free to rotate relative to the housing and rest upon the rails. The rails for this beam preferably should include a raised central portion 94 and the rollers should be relieved at the center, as indicated at 95, so that they have generally an hourglass shape designed to fit on the rails. This type of provision for the rails and the contour of the rollers will serve as extra guide means for the beam so that it may be readily rolled along the rails from one end of the beam without danger of twisting or binding on the rails. This provision greatly adds to the convenience of positioning the beam over the workpiece. A locking means is provided so that the beam will be firmly held in the desired position once it has been located. For this purpose a set screw 97 is threadably received in each roller housing 85 and by tightening a knob 98 may be forced against the top of portion 94 of the rail. This will cause flanges 86 and 87 of the roller housing to engage the underneath side of flanges 88 and 89 of the rail thus firmly locking the beam in position. The rollers and locking arrangement for the other holddown beams are exactly as illustrated and described for beam 30 for which reason corresponding parts have been given identical reference numbers.

The actual locking action by the beam in holding the workpiece may be provided by a plurality of cylinders 100 secured to the beam in a suitable manner such as by brackets 101 to cross members 102 which are attached by rivets to the sides of the beam (see Figs. 13 and 14). Hold down cylinders 100 include ordinarily pneumatically operated pistons 103 reciprocal in the interior thereof, and a rod 104 is carried by each piston and projects from the cylinder. Rod 104 carries a pad or foot 105 at the bottom thereof. Each pad 105, in turn, bears against a bottom channel member 106 so that when air pressure is introduced into the interior of the hold down cylinder, a force is exerted through the piston 103, rod 104, foot 105, and channel member 106 to the workpiece beneath the beam. The channel member serves to distribute the force along the workpiece and it is provided with a protective coating of a suitable material 108, such as cork, on the under surface thereof so that there will be no damage to the workpiece from the hold down means. These hold down cylinders, in forcing the workpiece against the table or against the drop leaf, firmly position the workpiece so that it is rigidly held and will not move during the bending operation.

Channel 106 is biased upwardly by means of a plurality of springs 109 which are suitably secured to the bottom of channel 106 by any means such as brackets 110 and are attached to the top of the beam by lugs 111. Thus if there is no air pressure within the hold down cylinders, springs 109 will move channel 106 upwardly off of the top of the workpiece. This assures that the beam or the workpiece may be moved freely and that the workpiece is not locked until air pressure is introduced into the cylinders so as to force the channel downwardly.

It is possible to construct the beam out of light sheet metal section as illustrated because of the tensioning provisions for the beam. This is supplied by means of a tension rod member 113 which extends over the top of the beam and on its under side engages vertical bracket 114 which is carried by the upper surface of the beam. This bracket is disposed at the central portion of the beam so that rod member 113 has a slight angle upwardly from the ends toward the center of the beam. Each end of rod 113 is threaded and passes through an opening in a fitting 116 to which it is secured by means of a threaded nut 117. Each fitting 116 is pivotally carried by a bolt 118, connected with links 119 and 120 which are pivotally carried at their other ends by bolt 122 which is mounted on the beam. It is possible by this arrangement of the rod member 113 to exert a downward force from the top of the beam to counteract the upward force which the hold down cylinders will exert when air pressure is introduced into the hold down cylinders. Thus if nuts 117 are tightened to shorted rod 113 a large downward force will be exerted through bracket 114 which will tend to bend the beam in the opposite direction from the bending action which will be produced by the hold down cylinders. Normally by these provisions an initial tension is given to the beam by means of rod 113 so that subsequent loading by the hold down cylinders will not cause the beam to bow upwardly.

It should be noted that tracks 31 and 32 of the table exactly match tracks 34 and 35 of drop leaf 24 when that drop leaf is in a raised position. Similarly tracks 31 and 32 meet tracks 125 and 126 of drop leaf 25 when the latter drop leaf is in a raised position. Both beams are thereby made movable to any position on the machine. When forming is taking place with drop leaf 25, and drop leaf 24 is in the down position, beam 30 may be rolled to a position on drop leaf 25 for holding down the portion of the workpiece on that drop leaf and beam 33 may be rolled to a suitable position on table 21 for holding a portion of the workpiece on the table.

For forming with drop leaf 24 when the beam has been suitably positioned and the workpiece has been firmly locked in place it is necessary to support a suitable die member adjacent table edge 29. For bend 6 the die must be within notch 14 adjacent edge 28 of the rigid backing member. This die-holding function is carried out by finger members 37, the detail arrangement of which is shown in Figs. 15–19. These members automatically extend to the position shown in Fig. 16 when drop leaf 24 is in a raised position for thereby supporting a die, and will automatically retract when the drop leaf is lowered. This feature is very important because, together with the unique floating attachment of the drop leaf to the table, it enables the production of a fully formed reinforced drain board top or the like wherein the die member has become an integral part of the completed article. The die will serve as the reinforcing member at the location of an outside bend and will abuttingly engage adjacent rigid backing members attached to the decorative sheet. For each finger a housing 128 is suitably secured to the table structure by means of screws 129 and 130. A movable element 131, having preferably a rounded contour as illustrated, is slidably received within housing 128 and serves when extended to support the die member. A second movable element 132 is included with member 131 and is slidable relative thereto. Slidable element 132 is provided with a slot 133 which receives a pin 134 secured to member 131. An aperture 135 may be provided in member 132 whereby manual movement of this member relative to element 131 is facilitated. When element 132 is in its retracted position relative to element 131, a portion of the top of element 131 is exposed which serves as a support for a die 17 of the type for providing a no-drip type of bend. Such a die, by including a reversely curved portion, is of a greater thickness than a die 18 which produces a normal waterfall outside bend. Die 18 may be merely a quarter round section of wood, accounting for its decreased thickness. Therefore, when element 132 has been slid to its extended position this element serves to support quarter round die member 18. For either type of die the finger members will provide a firm support at the proper location adjacent edge 29 of the table top.

As drop leaf 24 pivots, element 131 is automatically moved by means of a cam arrangement, so that the fingers are retracted when the drop leaf is lowered. A cam member 137 projects through a slot 138 in housing 128 so that it may engage member 131 within cylindrical aperture 140. Cam 137 terminates in a ball portion 141 which has a radius substantially the same as the radius of aperture 140. Because of this ball 141 will be in engagement with the walls of aperture 140 no matter what the relative position of the cam and member 131 may be.

Cam 137 is rigidly mounted on a shaft 142 so that it will rotate with this shaft. It is apparent thus far that when shaft 142 has been rotated so as to cause cam 137 to assume the position of Fig. 16 element 131 will be extended for supporting die 17. When cam shaft 142 is subsequently rotated so that the cam assumes the position of Fig. 17, element 131 will be withdrawn so that die 17 will no longer be held by the finger member. This enables plywood backing member 11 to assume a position abuttingly engaging the lower edge of die 17 while the decorative plastic material is formed about the surface of the die and backing member 10 contacts the other edge of die 17. The exact movement of the workpiece as this is accomplished is made more clear hereinafter.

Cam shaft 142 is automatically rotated when the drop leaf moves by a linkage which may be best seen in Figs. 8 and 9. Cam shaft 142 is rotatably carried by the table by suitable bearings 143. The end of shaft 142 is provided with a crank 145. Pivotally connected to this crank is a link 146 which connects with bellcrank 147. The opposite end of bellcrank 147 pivotally engages link 148, while the bellcrank is pivoted at 149 to the table structure. Link 148 extends forwardly to cylinder 39 to which it is attached by a bolt 150. By this linkage, when cylinder 39 is pivoted downwardly by means of actuating cylinder 42 to lower the drop leaf, bolt 150 will be moved generally to the left of the position shown in Fig. 8 which will cause crank 145 to move to the right and will effect rotation in a clockwise direction of cam shaft 142. The pivot point of link 148 and of cylinder 39 are arranged relative to each other so that most of the movement of cam shaft 142 and thus of members 131 will occur when the drop leaf is nearing its lowered position. Location of bolt 150 below stud 61, about which cylinder 39 pivots, gives this result by appreciably moving bolt 150 to the left only when cylinder 39 has pivoted a considerable distance. By this arrangement the fingers are withdrawn only when the drop leaf has almost completed the bending operation and when the plywood reinforcing members can extend beneath the die to support it as the fingers are withdrawn. Fig. 19 illustrates this action showing how member 131 is retracted in such a manner that the backing material will support the die as soon as the support of the finger elements is removed. In this figure die 18 is shown supported on the fingers, but the action is substantially the same, of course, when die 17 is being used.

The kinematics of the drop leaf are illustrated in Fig. 20. As illustrated in solid lines in this figure, drop leaf 24 is in a raised position. When in this raised position rails 34 and 35 of the drop leaf abuttingly engage rails 31 and 32 of the table which keeps the drop leaf in its extended position so that roller 56, which is attached to tensioning cylinder 39, is in the right hand side of slot 57 in the end flange of the drop leaf. The drop leaf could as easily be maintained in the extended position by pressure from the tensioning cylinders, or could be manually extended, if the rails did not so engage each other. The workpiece is secured in place with the drop leaf in this position and remains in this position after tension is applied thereto by the tensioning cylinder because the hold down means retain the workpiece firmly against the table and the drop leaf. The axis about which tensioning cylinders 39 and 40 pivot when the drop leaf is subsequently lowered is along a line perpendicular to point A, which is also the center of curvature of die member 18 shown in position for the bend. Point B represents the edge of plywood sheet 12 at notch 16. A non-floating type of drop leaf when pivoted relative to the table would cause point B to rotate about a radius extending between points B and A. However, there is not sufficient unreinforced plastic at the location of notch 16 to allow this path to be followed so that if the drop leaf merely pivoted about such a radius the unreinforced plastic material would be torn in two at the location of the notch.

By the unique floating action of the drop leaf of this invention whereby the drop leaf is retracted during a bend, pathway Y can be followed by point B as the drop leaf pivots relative to the table. This is despite the fact that the notch width substantially equals the peripheral width of the die surface about which the sheet is bent. By following such a path it will be noted that point B will clear the edge of die 18 and will end up at point A. Similarly point C follows pathway Z so that the plywood backing member 12 will be firmly abutting edge 152 of the die when the bend is finished. Plastic material 3 will be intimately formed about the die, yet will not be pulled apart or otherwise damaged. The plastic material itself will cause the drop leaf to move inwardly so that this type of bending path will be followed. The drop leaf is permitted to move in toward the table as the bend progresses because of the floating action of rollers 56 in slots 57, and in the connection between the drop leaf and the pistons of the tensioning cylinders. Note that when the bend is completed, as illustrated in phantom in Fig. 20, roller 56 has moved to the opposite end of the slot from the position illustrated in solid lines. The drop leaf was moved toward the table a distance corresponding roughly to the length of the slot as the bend progressed. It is therefore obvious that the drop leaf was caused to follow an involute curve as the material at the location of the notch was bent about the die and the drop leaf was retracted toward the table. This movement of the drop leaf during the bend occurred in opposition to the pressure within the tensioning cylinders. When pneumatic pressure is used in these cylinders the movement of the drop leaf may either additionally compress the air within the cylinders, or a certain quantity of the air may be bled off as the bend progresses and the drop leaf retracts toward the table. The plastic material used for this type of workpiece can withstand tension forces in the neighborhood of 600 pounds per lineal inch so that no difficulty is encountered from excess pressure in the tensioning cylinder urging the drop leaf away from the table in opposition to the returning forces exerted by the material. This force assures that material 3 is tightly wrapped around the die and a smooth bend is produced.

It may be noted that as the drop leaf progresses in its movement to the down position, additional force will be exerted on the plastic material by the weight of the drop leaf as it reaches a position other than horizontal. This force is counteracted to some extent by springs 48 within the tensioning cylinders, which engage the pistons as described above, biasing the pistons toward the table. Springs 48 also assure that the drop leaf will be as close to the table as possible when the drop leaf is in a raised position so that the rails of the drop leaf abut the rails of the table.

The edges of dies 17 and 18, as well as the curved surfaces thereof, are coated with a suitable adhesive prior to the bend so that they will be firmly held in engagement between the plywood backing member when the bend is completed. In many instances the die will be glued to the edge of the backing member which rests on the table prior to the bend as a matter of convenience in handling the die.

As mentioned briefly above, when the bull-nose or no-drip edge 6 is formed an auxiliary forming means 44 must be employed to urge the bendable plastic material into engagement with the reversely curved portions of die 17. For this purpose a rigid beam 155 is provided, extending across the machine. The details of this beam are best seen in Figs. 8, 12 and 21. The ends of this beam are rigidly secured to brackets 156 and 157. Extending across the upper side of the beam is a tension rod 158 bearing against bracket 159 at the center portion of the beam. When the threaded ends of rod 158 are tightened up by nuts 160 and 161 a downward force will be exerted on the beam in the same manner as for the hold down beams thus enabling the use of a light construction. Across the face of beam 155, opposite from rod 158, is a flexible rubber pad 162. Brackets 156 and 157 are pivotally secured to drop leaf 24 by means of pins 163 and 164. These pins include handles 165 and 166 and are of the quick-release pull-out type so that when the conventional rounded edge is being formed instead of the reversely curved type, forming means 44 may be easily removed from the machine.

When the drop leaf, with forming means 44, is pivoted to its lowered position the free bottom ends of brackets 156 and 157 will engage stops secured to the table structure. Thus as shown in Fig. 12 end 167 of bracket 156 engages stop 168 which comprises a screw threaded into bracket 169 of the table structure. This screw-threaded arrangement provides for adjustment of the location of stop 168. When the free ends of the brackets engage the stops as the drop leaf goes down, this pivots the brackets about pins 163 and 164 causing the top ends of the brackets, where the beam is located, to be urged inwardly toward the workpiece. As a result pad 162 engages the plastic material at the location of the reversely curved portion of die 17. This causes the plastic to be forced into intimate contact with this portion of the die so that sheet 3 will be reversely curved and the no-drip type of edge will be produced and will at the same time be rigidly reinforced at all portions thereof. The adjustable stop of course will enable controlling the amount of force exerted by rubber pad 162 by governing the travel of beam 155 toward the workpiece. If desired pad 162 could be replaced with an auxiliary die member having a contour complementary to the reversely curved portion of the finished part which would then urge the plastic into engagement with this portion of the die, but it has been found simpler to utilize a rubber pad as described.

For heating means 38 a suitable heater has been found to be an infrared resistance type heater having resistance element 171 with a reflector 172 as shown in Figs. 7 and 8. This type of heater will provide a localized intense heating of the type required so that the bendable portion of the plastic may be heated to a postformable temperature, i. e., about 250° F. to 350° F. Heater element 38 is pivotal relative to the table so that it can be used to heat the bendable portions of the workpiece for a bending operation by drop leaf 24 or by drop leaf 25. As shown in Fig. 6 the heater unit is disposed in a raised, neutral position with the actuating linkage for the heater not shown. The linkage whereby the heater may be held in heat transfer relationship with the workpiece and automatically removed from such relationship when the workpiece is bent can best be understood by reference to Fig. 7. By this arrangement the heater element is held by a suitable bracket 174 and is pivotal relative to a beam 175 which acts as a support for the heater element. Beam 175 is pivoted at 176 to the central portion of the table. A spring 177 is connected to the bottom of beam 175 and is fixed to the table at the other end by pin 178 disposed beneath mounting pin 176 of the beam. The spring counteracts the weight of the heater and urges beam 175 to a vertical or raised position. Pivotally attached to beam 175 above point 176 is a connecting link 179 which is in turn pivotally connected by pin 195 to tensioning cylinder 39.

When drop leaf 24 is pivoted downwardly in a forming operation the heater linkage will move to the vertical position shown in phantom in Fig. 7. This results because link 179 is moved generally to the right by the tensioning cylinder as the latter is pivoted through its 90° arc. Link 179 therefore pushes on heater support link 175 above the pivot point thereof and moves link 175 to a raised position. Heater resistance element 171 is in this manner moved to a position remote from the table and the drop leaves, and can cause no damage to the workpiece or interference with removal of the workpiece from the machine. Preferably link 179 is designed as a telescoping member so that when the drop leaf is subsequently raised after the forming operation has been completed and the workpiece removed, the link will elongate and will not draw beam 175 downwardly, and therefore will not bring the heater into heat transfer relationship with the workpiece. This will enable properly positioning the workpiece on the table and clamping it in place without danger of premature heating of the workpiece. When the bendable area of the workpiece is to be heated, beam 175 is manually drawn down to the position where it is in heat transfer relationship with this bendable portion of the workpiece. The link 179 is thus designed so that it will slip in the direction which would extend the link but will hold as the link pushes upwardly on the heater mounting beam 175. By manual operation it may be contracted for positioning the heater.

The detailed design of this telescopic link is shown in Fig. 22. As illustrated in this figure link 179 includes a central bar member 262 which connects at one end to tensioning cylinder 39 by pin 195, and extends slidably into a second link 263 of rectangular cross section. Link 263 is pivotally connected at 264 to the main heater support link 175. A portion of the top of link 263 is open as at 266 which gives access to teeth 267 formed in the top of bar 262. A bracket 268 connected with link 263 pivotally mounts pawl 270 which is forced by spring 271 into engagement with teeth 267. The telescoping provision of link 179 thus comprises a simple ratchet arrangement whereby links 262 and 263 can extend as pawl 270 slips on teeth 267, but which will form a non-slipping connection in the other direction as pawl 270 holds against teeth 267. Of course pawl 270 can be released against the force of spring 271 when it is desired to shorten link 179 in bringing the heater to its lowered position in heat transfer relationship with the bendable portion of a workpiece on the machine.

When it is desired to form on drop leaf 25 instead of drop leaf 24, pin 195 which connects link 179 to tensioning cylinder 39 can be removed and inserted in an opening 196 in the outer wall of cylinder 62. This opening corresponds in location to the position where pin 195 was mounted in cylinder 39. The action of the heater linkage in automatically removing the heater from the location of the workpiece will then be exactly the same as described for drop leaf 24.

For providing the cove or inside bend 8 an accurately machined round bar 201 extends along edge 20 of the table on the side of drop leaf 25 and serves as a die for forming the bend (see Figs. 23 and 24). This bar rests in a substantially U-shaped channel 202 to which it is firmly held by suitable means such as a plurality of screws 203. Channel 202 is in turn rigidly secured to the table structure. The forming of the cove bend is quite similar to the forming of the outside type of bend by the drop leaf 24. For forming with drop leaf 25 the workpiece is positioned with a bendable area adjacent die 201 and clamped in place by means of the hold down means 30 and 33 as described above. However, for the cove type of bend the decorative plastic sheet will naturally be located adjacent the table top and the top of drop leaf 25 with notch 15 facing upwardly. The plastic material of notch 15 is then heated by the heater, tensioned by cylinders 63 and 64 and bent by the actuating cylinders as was the case for drop leaf 24. Of course when postforming on drop leaf 25, drop leaf 24 will be placed in the lowered position and held in this position by locking means 76. This anchors actuating cylinder piston rods 68 and 69, and allows the actuating cylinders to move in response to pressure therein, thus pivoting drop leaf 25. The floating action of drop leaf 25 is the same as for drop leaf 24, but there is of course no necessity to move the die out of the way when an inside bend is made.

Prior to making a bend it is of course quite important to accurately position the workpiece on the table and the drop leaf so that the bending action will take place at exactly the location of the notch between the rigid backing members. Gages 210 and 212 are provided to serve as the positioning means for the workpiece (see Figs. 24, 25 and 26). Gage 210, which is illustrated in detail and which is similar in construction to gage 212, consists of a body portion 213 which has an aperture complementary to die bar 201. Thus body portion 213 fits on the die bar on which it is slidable to any desired position. The body portion 213 includes a second aperture through which bolt 215 passes and threadably engages a nut 216 which has a rounded surface portion 217 adapted to engage the die bar. Bolt 215 includes a head portion 218 and a handle 219 so that by rotation of the bolt by handle 219 nut 216 is tightened against the die bar as is the body portion, which will thus lock the gage means along the die bar at any position.

Extending from the body of each gage means is a rigid bar 220. Each bar extends the width of the machine to table edge 29 and terminates in an inwardly extending tab 221. Rods 220 are threaded into body portions 213 so that the length of each is adjustable and thus the inner surface 222 of tab 221 can be adjusted and positioned exactly at edge 29 of the machine. When forming an outside bend by drop leaf 24, die 17 or 18, whichever type is being used, is left slightly shorter than the width of the plastic sheet overlying the die and also in the same manner slightly shorter than the rigid backing material. This distance need be only in the neighborhood of a quarter of an inch and actually helps a forming operation by precluding any tendency of the material to crack at the edges. Gage means 210 and 212 are then slid along die bar 201 until tabs 221 are received within the relieved portion of the notch of the workpiece adjacent edge 29 of the table with surfaces 222 thereof in engagement with the edge of the backing material which is on the table. For example, when forming a no-drip edge surfaces 222 of the tabs 221 will engage edge 28 of backing member 11, as shown in Fig. 25. The workpiece positioned with this edge abutting surfaces 222 of tabs is thereby accurately located with the notch exactly at the edge of the table.

Body portion 213 of the gage means also includes a tab 224 having a flat surface 225 corresponding to tab 221 with its flat surface 222. Surface 225 is disposed exactly along the center line of guide bar 201. Thus when the cove-type bend is to be produced and the workpiece is positioned with the edge of the rigid backing member engaging surface 225, the bendable unreinforced plastic portion will be disposed with the edge of the notch exactly at the vertical center of the die bar 201 so that the forming operation will be accurate and there will be no possibility of breaking the workpiece. It is particularly desirable to use die bar 201 as a reference member for the gage means because this bar is very accurately machined and is disposed in a predetermined parallel relationship with edge 29 of the table.

When a bend has been completed, removal of the workpiece from the machine is simplified by a pivotal connection of the tracks of the drop leaves. This arrangement is best seen in Fig. 10. Track 34 is illustrated in this figure and the other tracks on the drop leaves are held in a similar manner. The outer end of track 34 is pivotal about mounting bolt 227. The inner end of the track is held to flange member 58 by means of an easily removable pin 228 having handle 229. When a bend has been completed, the pressure exerted by the hold down means associated with the beam may be released, following which pin 228 is removed by means of handle 229. The pin for track 35 on the opposite side of the machine is removed in a similar manner. The tracks are then pivoted about their mounting pins—227 for track 34—to the position illustrated in phantom in Fig. 10. When in this position the workpiece may be easily removed from the drop leaf without interference from the beam. To prevent the track and the beam from pivoting too far downwardly a projecting tab 230 extends from the track 34 and when the track is pivoted outwardly from the drop leaf to the position shown this tab will interferingly engage member 58 preventing further pivotal movement of the track.

In some instances backsplash portion 5 of the workpiece may be very short so that when forming cove bend 8 the beam cannot be positioned over the backsplash portion in the usual manner for clamping this portion to the table. In such cases an adapter may be used such as illustrated in Fig. 23. This adapter may be a substantially U-shaped member 232 comprised of two wood projecting portions 233 and 234 attached by screws 235 and 236 to a metal plate 237. Members 233 and 234 extend the entire length of the workpiece. Leg 234 is shorter than 233 and is adapted to engage the top of rigid backing material 12 while leg 233 rests on top surface 23 of the table. When the beam is positioned above adapter 232 and the hold down cylinders are actuated the hold down force will be exerted through plate 237 and leg 234 to the workpiece and will thereby hold the short backsplash portion firmly in engagement with the top of the table for a forming operation.

It is necessary when using adapter 232 to make provision for raising tracks 31 and 32 so that the beam can be elevated to the higher position shown in Fig. 23 where it is disposed above the adapter 232. This is accomplished by making tracks 31 and 32 in two sections one of which is movable and located on the side of the machine adjacent drop leaf 25. Figs. 27 and 28 illustrate the track sections for one side of the machine only but the other side is exactly the same in construction. Thus as illustrated track 31 is formed in two portions, a stationary portion 238 and movable section 239 terminating at edge 200 of the table. This movable track section includes downwardly depending flanges 240 and 241 which extend over fixed plate member 242 which is attached to the table structure. Disc members 243 and 244 are received within complementary openings in plate 242 and are freely rotatable therein. Pins 245 and 246 extend from these cams to which they are attached in an off center relationship near one edge as illustrated. These pins extend into horizontal slots 247 and 248 in depending flanges 240 and 241 in which they are freely movable. When discs 243 and 244 are in a position where pins 245 and 246 are lowered, track 239 will also be lowered and will be in line with the permanently located section 238 of track 31, and with the track section on the drop leaf. However, when discs 243 and 244 are rotated through 180° so that pins 245 and 246 are at the topmost position, track section 239 will be raised by the pins sufficiently to permit the beam when on this track section to pass over adapter 232. Because the pins will always be in the top position or the bottom position, the line of force urging the track section upwardly when the beam exerts a downward pressure on the workpiece will be directly in line with the center of the discs and will have no tendency to cause rotation of the discs.

In order that the discs may be rotated simultaneously sprockets 250 and 251 are provided on the ends of pins 245 and 246 with a chain 252 extending between the sprockets. Handle 253 is connected with one of the pins so that by rotating the handle through 180° the sprocket and the chain drive rotates the discs, thus moving the track section between the raised and the lowered position. In order that track section 239 will travel in a vertical plane when the discs are rotated, vertical slots 255 and 256 are provided in flange portions 240 and 241. Pins 257 and 258, which are attached to the fixed plate, slide in these slots as the track goes up and down so that track section 239 will always move vertically.

It is of necessity of course to accurately determine the temperature of an unreinforced bendable portion of a workpiece on the machine so that this workpiece may be heated to the postforming temperature range prior to a bending operation. The machine of this invention is provided with two temperature sensing elements 275 and 276 to give an indication when a workpiece associated with either of the drop leaves has obtained the proper temperature. These elements are automatically positioned beneath the workpiece for sensing the temperature thereof when the heater is brought into heat transfer relationship with the workpiece.

Temperature sensing element 275 is for determining the temperature of a workpiece to be bent by drop leaf 24, and the operation thereof may be seen by reference to Figs. 29 and 30. In the position shown in these drawings the temperature sensing element is raised so as to indicate the temperature of the workpiece. The end portion 277 thereof is comprised of an ordinary thermocouple element employing dissimilar metals and having lead wires 278 and 279 extending therefrom. Portion 277 is received within a tubular bracket member 280 and biased upwardly by means of spring 281. Bracket 280 is mounted on a rod member 282 which extends downwardly therefrom and then inwardly toward the underneath portion of the table. The bottom end of rod 282 is slidably received within a tube member 284, the latter being axially fixed but rotatable in a suitable bearing arrangement 285. Rod 282 includes a pin 286 on the end thereof which is received within a slot 287 of tube member 284. Spring 288 biases rod 282 outwardly so that pin 286 bears against the end of slot 287 when the rod is in the raised position as illustrated in Figs. 29 and 30. Thus by the provisions of the spring, the pin and the slot, rod 282 is axially slidable within tube 284 in a path limited by the slot in opposition to the spring force, and yet the rod will turn angularly with any rotative movement of the tube.

Mounted on tube 284 and rotatable therewith is an arm 290. This arm is connected with a link 291 which in turn is connected to bellcrank 292. The other end of the bellcrank through link 293 is attached to pivotal member 294. The latter member is pivoted at 295 to a bracket 296 which is rigidly attached to the table. Fittings 298 and 299 are carried by member 294 on opposite sides of the mounting pin 295. These fittings have central apertures therethrough which slidably receive wires 300 and 301. Stops 302 and 303 are carried on the ends of wires 300 and 301 respectively. Obviously if wire 300 is moved to the right from the position illustrated in Fig. 30 stop 302 by engaging the fitting 298 will pivot member 294 clockwise. Similarly after such movement wire 301 may be moved to the right which will cause stop 303 to engage fitting 299 and move member 294 counterclockwise.

Wires 300 and 301 are received within protective guide cables 305 and 306 so that the wires and the guide cables co-operate to form an ordinary flexible Bowden cable which transmits motion. Wire 300 is guided from beneath the table to a connection at its opposite end with fitting 307 mounted on crank 308 to which it is secured by means of set-screw 309 (see Fig. 8). Arm 308 is held to tensioning cylinder 39 by means of nut 62 of mounting stud 61 and suitably keyed or otherwise rotatably secured to the body of cylinder 39. Therefore when the tensioning cylinder is pivoted downwardly as the drop leaf is lowered for a bending operation, crank 308 will move counterclockwise therewith through 90° from the position illustrated in Fig. 8. This moves wire 300 at the location of the crank which transmits an equal amount of motion to the other end of the wire so that it will move to the right from the position illustrated in Fig. 30. This will, as noted above, cause clockwise movement of member 294. Upon such movement link 293 will cause bellcrank 292 to move counterclockwise, and thus link 291 will cause arm 290 to also move counterclockwise. This movement of arm 290 rotates tube 284, thus causing rotation of rod 282 which pivots the thermocouple element downwardly out of contact with the workpiece through an angle of 90°. The linkage is so arranged that the bottom portion of bellcrank 292 is cocked well to the left when the unit is in the raised position so that initial movement of link 293 causes considerable angular movement of crank 292 and thus of the thermocouple supporting rod. When the movement of the drop leaf has neared its completion this bellcrank will move at a slower rate. This arrangement assures that the thermocouple element will be rapidly moved out of the way as the drop leaf moves downwardly so that there will be no possibility of interference between the drop leaf and any portion of temperature sensing element 275.

When rod 282 has reached its fully lowered position and the drop leaf subsequently pivots downwardly, the bottom of the drop leaf will engage rod 282. This will cause no damage to temperature sensing element 275 and will merely displace rod 282 a slight distance axially within tube 284 in opposition to the spring force as the drop leaf continues to its fully lowered position. By this linkage, therefore, thermocouple element 277 is initially maintained in position beneath the workpiece out of the way of direct heat from the heating element and in firm contact with the bottom portion of the workpiece. This element is subsequently pivoted sideways out of the notch in the workpiece as the bending operation takes place so that there is no interference with the workpiece or the operation of the machine.

When member 294 pivots as the drop leaf is lowered, fitting 299 slides relative to wire 301 until the fitting is brought adjacent stop 303. Raising of the drop leaf following the bending operation will, by means of crank 308, slide wire 300 to the left until it attains its original position, but because this wire is slidably received in fitting 298 it will cause no corresponding angular movement of member 294. Thus when another workpiece is disposed on the table and drop leaf, the temperature sensing element will be in its lowered position and out of the way of the workpiece as it is being positioned on the machine. Raising of the temperature sensing element is accomplished through wire 301 and stop 303 which are caused to move to the right as the heater element is lowered to a position of heat transfer relationship with the workpiece. It is only then, of course, that obtaining the temperature of the workpiece is necessary. To accomplish this movement of rod 282, the opposite end of wire 301 connects with fitting 310 which is secured to the main heater support link 175 by means of set-screw 311 (see Fig. 7). When this support member is brought from its raised position to its lowered position it pulls on wire 301 displacing it to the right from the position of Fig. 7. This causes stop 303 to engage fitting 299 and effects counterclockwise rotative movement of member 294 which will return the linkage to its raised position. Since heater support member 175 is not moved through a distance of 90° in bringing it to its lowered position it is necessary at the distance between fitting 310 and pivot point 176 of heater link 175 be greater than the distance between fitting 299 and pivot pin 295 so that there will be 90° of angular movement transmitted to member 294.

The provision for drop leaf 25 is very similar to that used for drop leaf 24, for which reason the parts of temperature sensing element 276 which correspond with those of element 275 will be given the same number with a suffix "a." The notch in the workpiece is on top in this case so that it is not necessary that the thermocouple member be moved sideways in getting out of the notch as the drop leaf pivots downwardly. Therefore the linkage is disposed at 90° to the arrangement of element 275. Furthermore, the rod 282a can pivot downwardly so that it completely avoids any contact with the bottom of the drop leaf by reason of its angular relationship with the drop leaf so that there is no necessity for employing a telescopic tube arrangement such as tube 284. Therefore rod 282a is directly mounted on shaft 285a and rotates therewith. Again a Bowden cable is employed so that wire 300a engages an arm 308a attached to the pivot point of tensioning cylinder 63. The tensioning cylinder moves down, arm 308a causes movement of wire 300a to the left, thus causing counterclockwise rotation of member 294a. Raising of the drop leaf subsequently will not raise the temperature sensing element due to the slipping connections at member 294a. However, wire 301a is connected to fitting 310 when the drop leaf 25 is in use so that movement of the heater support member 175 to the lowered position in bringing the heater element to a heat transfer position with the workpiece will cause opposite angular movement of member 294a. This in turn through the links will cause arm 282a to move upwardly to the position shown in Fig. 31 where it is directly beneath the bendable area of the workpiece and in contact with the underneath surface thereof.

The means for actuation of the various elements of the machine are illustrated in schematic Fig. 32. Although the various members used in applying forces for holding and bending the workpiece may be any desired type in the preferred embodiment these are pneumatic cylinders. Therefore, for operating these pneumatic cylinders an air compressor 320 is connected to an accumulator 321 for delivering a supply of air at a substantially constant pressure. This accumulator connects to the supply lines leading to the various cylinders of the machine. Thus manifolds 324 and 325 branch off of line 322 and serve hold down cylinders 100. The control of these hold down cylinders for clamping a workpiece on a machine is obtained through actuation of three-way valve 326. This valve may be turned so as to admit air through lines 324 and 325 or may be turned to close off this air supply and to bleed the air from within the hold down cylinders so as to release the workpiece. Pressure reducing valve 323 in line 322 enables control of the force exerted by the hold down cylinders. Tensioning cylinders 39, 40, 63 and 64 are also controlled by three-way valves through connections from a main air supply line 327. The two tensioning cylinders for each drop leaf may be controlled by but a single three-way valve because it is desirable to apply an equal amount of force with each cylinder as the drop leaf is urged away from the table. Accordingly line 330 branches off of supply line 327 and divides to supply tensioning cylinders 39 and 40, the control of which is accomplished by means of three-way valve 331. Similarly valve 334 controls the line 335 to tensioning cylinders 63 and 64. Pressure reducing valve 336 governs the force exerted by the tensioning cylinders.

Control of actuating cylinders 42 and 43 is accomplished by means of a solenoid valve 342. This valve receives air pressure through line 343 which includes a pressure governing valve 344. Valve 342 is a three-way valve so that pressurized air may be admitted through line 345 to one side of the cylinders for actuation in one direction or through line 346 to the other side of the cylinders for actuation in the opposite direction. These actuating cylinders are of course a simple type in which rods 69 and 73 connect with pistons 337 and 338 inside the cylinders. Air on one side or the other of the pistons will move the pistons and the rods in one direction or the other. Conductors 348, 349 and 350 connect solenoid valve 342 with a source of electrical energy 351. Main switch 352 is a three-position switch and can disconnect both of conductors 349 and 350 or connect these conductors individually to the source of electric energy. This is required because solenoid valve 342 is a three-way valve and connection of one of the wires will cause the solenoid to operate in one direction and the other wire will cause it to operate in the other direction. Conductor 348, through switch 353, also connects with the source of electrical energy to complete the circuit. When switch 353 is manually operated, actuation of the solenoid valve will take place in one or the other direction depending on which of wires 349 and 350 is connected with the valve for operating the actuating cylinders as desired.

In the preferred embodiment there is a provision for automatically operating the actuating cylinder in addition to the manual switching arrangement through switch 353 as just described. This automatic arrangement is obtained through the thermocouple elements of temperature sensing elements 275 and 276. For purposes of simplicity only one of these elements is shown in the schematic drawing of Fig. 32 while actually there are two of these elements which are identical in their electrical arrangements. Thermocouple element 277 as illustrated in Fig. 32 is associated with a movable contact element 355 which will be moved angularly in accordance with the amount of current flowing through the thermocouple lead wires and thus in accordance with the temperature of the workpiece as sensed by the thermocouple. When a predetermined temperature has been reached which is suitably calibrated to be a temperature within the postforming range, arm 355 closes the circuit to conductor 356 so that current may flow through conductors 356 and 357, by reason of a suitable source of electrical energy 358. Relay 359 is included in this circuit and when current therein flows through the relay, contact 360 will be closed thus allowing current to flow from the main source of electrical energy 351 to conductor 348 and thus to the solenoid valve to cause automatic operation thereof. Switch 361 in the thermocouple circuit will enable that circuit to be cut out for manual operation of switch 353. Of course, if desired, the thermocouple elements may be additionally or alternatively connected with suitable gages or dials which will give a visual direct reading of the temperature of the workpiece as sensed by the thermocouple.

It is therefore obvious from the above description that I have provided a means whereby a fully formed reinforced finished part such as that illustrated in Fig. 2 may be quickly and easily produced from a workpiece such as that illustrated in Fig. 1. The workpiece may be accurately positioned on the machine for a bending operation and is firmly held in place by means of the movable hold down means which can move to a position over the workpiece on either of the drop leaves and on the table. The heater element then heats to a postformable temperature only the portions of the workpiece to be bent at the location of the notch. A tension is applied to the bendable portion as it is formed about the die so that a tight uniform bend is produced and the plastic material is brought into intimate contact with the die. The drop leaves are arranged with a floating connection so that an involute curve is followed during the bending and the proper relationship is assured between the die and the rigid reinforcing members attached to the plastic.

Certain modifications may be made in the details of the method and means set forth without departing from the basic underlying invention. The foregoing detailed description, therefore, is to be clearly understood as given by way of illustration and example only, the spirit and scope of this invention being limited only by the appended claims.

I claim:

1. A device for bending unbacked portions of a sheet of postformable material portions of which are backed with a rigid reinforcing material, said device comprising a fixture for receiving and securing portions of said sheet whereby an unbacked portion thereof is unconstrained by said fixture; means associated with said fixture for supporting a die adjacent said unbacked portion of said sheet when so held; a heater associated with said fixture for heating said unbacked portion to the approximate range of 250° F. to 350° F.; and means associated with said fixture for simultaneously applying tension to and bending about said die said unbacked portion when so heated, and holding said portion so bent until cooled.

2. A device for bending a sheet of postformable material having rigid backing members attached thereto in spaced parallelism thereby to define unbacked bendable portions, said device comprising a fixture for gripping and holding a backed portion of said sheet; at least one die associated with said fixture and disposed whereby when said sheet is held by said fixture an unbacked portion thereof is adjacent said die; a heater disposed in heat transfer relationship with said unbacked portion for heating said portion to the approximate range of 250° F. to 350° F.; and a pivotal member associated with said fixture, said member including means for gripping and holding portions of said sheet extending beyond said fixture and said die, applying tension to said unbacked portion, and pivoting said unbacked portion about said die when said unbacked portion has attained such a temperature whereby said unbacked portion assumes the contour of said die.

3. A device for bending unbacked portions of a sheet of postformable material portions of which are reinforced with spaced backing members, said device comprising a table adapted to support a backed portion of said sheet whereby an unbacked portion extends therebeyond; means for securing said sheet so disposed upon said table; means associated with said table for supporting a die adjacent said unbacked portion; a heater for heating said unbacked portion to the approximate range of 250° F. to 350° F.; and means associated with said table for engaging portions of said sheet extending beyond said table, said means including means to grip said portions, simultaneously applying tension to said unbacked portion and bending said unbacked portion about said die whereby said unbacked portion assumes the contour of said die, and holding said sheet in such position until cool.

4. A device as recited in claim 3 in which said die supporting means is retractable, and including means interconnecting said die supporting means and said means for engaging said extending portions of said sheet, said interconnecting means including means for retracting said die supporting means at an increasing rate as said bending progresses whereby said die supporting means is removed from said die immediately prior to completion of said bend and said die is disposed in abutting engagement with adjacent backing members upon conclusion of said bend.

5. A device for bending unbacked portions of a sheet of postformable plastic material portions of which are reinforced with spaced backing members, said device comprising a stationary fixture adapted to receive a backed portion of said sheet whereby other portions of said sheet including an unbacked portion are remote therefrom; means on said fixture for securing said sheet thereto; a die; means associated with said fixture for supporting said die adjacent said remote unbacked portion; a heater associated with said fixture for heating said unbacked portion to the approximate range of 250° F. to 350° F.; movable means for gripping portions of said sheet extending beyond said fixture; temperature sensing means associated with said fixture for sensing the temperature of said unbacked portion; and means interconnecting said movable means and said fixture for causing said movable means to apply tension to said unbacked portion and simultaneously bend said portion about said die when said portion has attained said range.

6. A device for bending a sheet of postformable plastic material having rigid backing members attached thereto in spaced relationship thereby to define unbacked bendable portions; said device comprising a table; means associated with said table for holding at least two dies adjacent thereto; said table being adapted to support said sheet with portions thereof extending beyond said table whereby a bendable portion thereof is brought into adjacency with such a die; pivotal means associated with said table in laterally spaced relationship therewith for engaging portions of said sheet extending beyond said table; heater means associated in heat transfer relationship with said bendable portion of said sheet for heating said portion to the approximate range of from 250° F. to 350° F.; means associated with said pivotal means for applying tension to said bendable portion; and means associated with said pivotal means for effecting pivotal movement thereof whereby said bendable portion is formed about said adjacent die to the contour thereof while said portion is under tension, and for holding said sheet so bent until cool.

7. A device as recited in claim 6 in which at least one of said die holding means is operably interconnected with said pivotal means for retracting said die holding means during said pivotal movement whereby a die held thereby is retained between adjacent backing members upon completion of such pivotal movement.

8. A device as recited in claim 6 including in addition a forming member operably interconnected with said pivotal means, for engaging said bendable portion opposite said adjacent die upon said pivotal movement to urge said portion into intimate contact therewith.

9. A device for bending a sheet of plastic postformable material having backing members attached to one side thereof in spaced parallelism thereby defining unbacked bendable portions, said device comprising a table for supporting said sheet of material on its upper surface; a drop leaf at an edge of said table; mounting means for securing said drop leaf to said table, said mounting means providing a floating pivotal connection whereby said drop leaf is pivotal from a raised position substantially coplanar with said table surface to a lowered position substantially at right angles to said surface, and is movable between an extended position laterally displaced from said table edge and a retracted position adjacent said table edge; means for securing said sheet to said table and said drop leaf with said drop leaf in a raised extending position and an unbacked portion of said sheet adjacent said table edge; means for supporting a die at said table edge; heater means for heating said unbacked portion to the approximate range of from 250° F. to 350° F.; means for applying tension to said unbacked portion, including means for exerting a yieldable force on said drop leaf means urging said drop leaf means toward an extended position; and means for pivoting said drop leaf means to a lowered position whereby said unbacked portion is bent about said die and said sheet of material returns said drop leaf to a retracted position during said pivotal movement in opposition to said yieldable means, the pivoted portions of said sheet of material thereby following an involute curve, said last mentioned means being further operable to hold said drop leaf in said lowered position until said unbacked portion is cool.

10. A device for forming from at least one elongated die member and a sheet of postformable material having rigid backing members attached to one side thereof to thereby define unreinforced bendable portions of said sheet, a part having at least one bent portion reinforced by a die member, said device comprising table means for supporting portions of said sheet; drop leaf means; means for pivotally mounting said drop leaf means on said table means, said mounting means including a floating connection whereby said drop leaf means is movable laterally with respect to said table means, said drop leaf means including a supporting surface for supporting other portions of said sheet whereby an unreinforced bendable portion is adjacent an edge of said table means; means for holding said elongated die adjacent said edge of said table means and adjacent an unreinforced portion when said sheet is so supported; means for applying tension to said unreinforced portion, including means for laterally urging said drop leaf means away from said table means; heater means associated with said table means and adapted to assume a position in heat transfer relationship with said unreinforced portion whereby said portion is heatable to the approximate range of 250° F. to 350° F.; means for pivoting said drop leaf means with respect to said table means whereby said unreinforced portion when so heated is formed about said elongated die and said drop leaf means is laterally moved toward said table means during said pivotal movement, and further operable for holding said sheet in such position until cool, said means for holding said die being interconnected with said means for pivoting said drop leaf means whereby said die holding means is retracted during said pivotal movement immediately prior to the completion thereof, and said elongated die is disposed between two adjacent backing members upon conclusion of said pivotal movement.

11. A device for bending portions of a sheet of postformable plastic material having rigid backing members attached to one side thereof the edges of which are in spaced parallelism thereby defining unbacked bendable portions of said sheet, said device comprising a fixture means for receiving and holding portions of said sheet; a convex bending unit associated with said fixture and adapted to bend convexly the side of said sheet remote from said backing material, said convex bending unit including drop leaf means floatingly pivotal relative to said table, retractable means for supporting a die having a predetermined contour and at least two edge portions whereby such a die is disposed adjacent said fixture with one of said edge portions adjacent a backing member on said fixture, means for securing backed portions of said sheet to said drop leaf means with a bendable portion thereof adjacent said die, means for applying tension to said sheet so secured, means for heating said bendable portion to the approximate range of from 250° F. to 350° F., means for pivoting said drop leaf means to a lowered position relative to said fixture whereby said bendable portion is conformed to said surface of said die, whereby said other edge of said die engages the backing member on said drop leaf upon completion of said pivotal movement, said die thereby becoming an integral reinforcing portion of a bent sheet, and means for retracting said die supporting means during said pivotal movement of said drop leaf and immediately prior to the completion of said bend whereby said die is supported at all times during this bending operation; and a concave bending unit for concavely bending said side of said sheet remote from said backing members, said concave bending unit including a drop leaf means floatingly pivotal relative to said table, a die, means for supporting said die adjacent said fixture, means for securing portions of said sheet to said drop leaf means with a bendable portion thereof adjacent said die and said backing members remote therefrom, means for applying tension to said sheet so secured, means for heating said bendable portion to the approximate range of from 250° F. to 350° F., and means for pivoting said drop leaf means to a lowered position relative to said fixture for thereby bending said bendable portion about said die.

12. A device for bending a workpiece comprised of a sheet of postformable plastic material having rigid backing members attached thereto in spaced relationship thereby the define unbacked bendable portions, said device comprising a table having means for supporting portions of a workpiece on the upper surface thereof; a drop leaf means associated with said table on one side thereof for producing a bend in said plastic material in one direction; a second drop leaf means associated with said table on the other side thereof for producing a bend in said plastic material in the opposite direction; mounting means for pivotally connecting each of said drop leaf means to said table whereby each drop leaf means is pivotal from a raised position substantially coplanar with said table surface to a lowered position substantially at right angles to said table surface, each of said mounting means including a floating connection permitting each drop leaf means to move laterally with respect to said table means; means for mounting an elongated die adjacent either side of said table and the drop leaf means associated therewith whereby said workpiece is positionable upon said table and a drop leaf means with a bendable portion thereof adjacent a die; hold down means for securing said workpiece to said table and a drop leaf means; means for applying tension to a bendable portion so positioned, including means for yieldably urging each of said drop leaf means laterally away from said table surface to exert a tension force on said bendable portion; heater means associated with said table and adjustable to assume a position of heat transfer relationship with a bendable portion of a workpiece associated with either of said drop leaf means for heating said bendable portion to the approximate range of between 250° F. to 350° F.; means for pivoting each of said drop leaf means with respect to said table to thereby form about an adjacent die a bendable portion so heated and placed under tension whereby upon such bending said sheet of material laterally retracts said drop leaf means in opposition to said means yieldably urging said drop leaf means away from said table, the mounting means for one of said dies being interconnected with its adjacent drop leaf means whereby said die mounting means is automatically retracted upon pivotal movement of said adjacent drop leaf means so that said die is disposed in abutting relationship with adjacent backing members upon conclusion of said bend.

13. The method of providing a reinforced plastic article having at least one bent portion comprising the steps of attaching to one side of a substantially flat sheet of C-stage thermosetting resinous material rigid backing members disposed in spaced parallelism whereby the edges thereof define an unreinforced portion of said sheet; supporting an elongated die adjacent said unreinforced portion between the edges of adjacent backing members; heating said unreinforced portion to the approximate range of 250° F. to 350° F.: gripping reinforced portions of said sheet on either side of said unreinforced portion; urging said reinforced portions apart whereby tension is applied to said unreinforced portion; pivoting said reinforced portions relative to each other so as to bend said unreinforced portion about said die; and removing the support from said die during said bend and immediately prior to the completion thereof whereby when said bend is completed said die is disposed in engagement with said bent portion and in abutting relationship with said adjacent backing members.

14. The method as recited in claim 13 including in addition the steps of providing said die with a reversely curved surface, and near the completion of said bend urging a forming member into engagement with said unreinforced portion opposite said die thereby to urge said unreinforced portion into intimate contact with said reversely curved portion of said die.

15. The method of providing a reinforced plastic article having at least one bent portion comprising the steps of providing an elongated die member with a curved surface interconnecting two edges; attaching to one side of a substantially flat sheet of C-stage thermosetting resinous material rigid backing members in parallelism spaced at a distance substantially equal to the peripheral width of said die surface to thereby define unreinforced portions; supporting said die member between adjacent backing members and next to an unreinforced portion of said sheet with one edge of said die abutting one edge of a backing member; heating said unreinforced portion to the approximate range of 250° F. 350° F.; gripping reinforced portions of said sheet and urging said portions apart whereby said unreinforced portion is placed under tension; pivoting one of said reinforced portions relative to the other of said reinforced portions whereby said unreinforced portion is formed about said die and said other edge of said die member is brought into abutting engagement with the edge of the other adjacent backing member so that said die forms a reinforcing member for said bent portion of said workpiece; and holding said workpiece so bent until cool.

16. A device for bending a sheet of postformable plastic material having backing members attached to one side thereof, the edges of which are in spaced parallelism thereby defining unbacked bendable portions of said sheet, said device comprising a fixture for receiving and holding portions of said sheet with other portions thereof extending beyond said fixture; and a plurality of bending units associated with said fixture, at least one of said units being a convex bending unit adapted to bend convexly the side of said sheet remote from said backing members, and at least one of said bending units being a concave bending unit adapted to bend concavely the side of said sheet remote from said backing members; each of said bending units comprising drop leaf means for gripping portions of said sheet extending beyond said fixture and including means for placing a bendable portion of such a sheet under tension by exerting a lateral force on said bendable portion, heater means associated in heat transfer relationship with said bendable portion for heating said portion to the approximate range of 250° F. to 350° F., means associated with said fixture for supporting a die adjacent said bendable portion, and means associated with said fixture for pivoting said drop leaf means relative to said fixture whereby said bendable portion is formed about said die, and to hold said portion so formed until cool, said convex bending unit including means for retracting the die support associated therewith during such a forming operation whereby upon completion of a bending operation by said unit the die associated therewith is disposed between adjacent backing members.

References Cited in the file of this patent

UNITED STATES PATENTS

| Re. 18,808 | Brundage | Apr. 25, 1933 |
| 1,666,649 | Harris | Apr. 17, 1928 |
| 2,183,984 | Campbell | Dec. 19, 1939 |
| 2,214,673 | Hauser | Sept. 10, 1940 |
| 2,382,807 | Nobles | Aug. 14, 1945 |
| 2,648,370 | Beach | Aug. 11, 1953 |

OTHER REFERENCES

Modern Plastics, April 1952, pp. 103–105, "Counter Tops Moulded to Shape."

Modern Plastics, Nov. 1953, pp. 113–115, "Beauty Bent for Strength, Convenience, Economy."